United States Patent [19]

Grigoriev et al.

[11] 4,226,965

[45] Oct. 7, 1980

[54] METHOD FOR PREPARING POLYMERS AND COPOLYMERS OF HIGHER α-OLEFINES

[76] Inventors: Vasily A. Grigoriev, ulitsa O. Koshevogo, 10, kv. 71; Zinaida V. Arkhipova, Porokhovskaya ulitsa, 54/1, kv. 210; Gurgen A. Balaev, prospekt Morisa Toreza, 94, korpus 3, kv. 5; Nikolai G. Bakajutov, kanal Griboedova, 29, kv. 24; Vera I. Vysotskaya, Grazhdansky prospekt, 77, korpus 2, kv. 8; Arkady V. Polyakov, prospekt Morisa Toreza, 9, kv. 193; Vitaly M. Zapletnyak, Moskovskoe shosse, 4, kv. 185, all of Leningrad, U.S.S.R.

[21] Appl. No.: 947,334

[22] Filed: Sep. 28, 1978

[51] Int. Cl.² .................... C08F 4/66; C08F 10/14
[52] U.S. Cl. ................... 526/116; 252/431 R; 526/308; 526/348.4; 526/348.5
[58] Field of Search ................ 526/116, 348.6

[56] References Cited

U.S. PATENT DOCUMENTS

| | | | |
|---|---|---|---|
| 2,936,302 | 5/1960 | Jones et al. | 526/348.6 |
| 3,567,653 | 3/1971 | Wagensommer et al. | 526/116 |

FOREIGN PATENT DOCUMENTS

| | | | |
|---|---|---|---|
| 1946584 | 3/1971 | Fed. Rep. of Germany | 526/116 |
| 2655394 | 6/1978 | Fed. Rep. of Germany . | |

*Primary Examiner*—Edward J. Smith
*Attorney, Agent, or Firm*—Haseltine, Lake & Waters

[57] ABSTRACT

Polymerization or copolymerization of the starting monomers is carried out in a hydrocarbon medium in the presence of a catalyst containing an alkylaluminium chloride compound, a trialkylvanadate and an alkoxyderivative of titanium, or zirconium, or hafnium. The method of the present invention makes it possible to considerably increase the polymerization rate and degree of conversion in the preparation of polymers and copolymers of higher α-olefines. The resulting polymers of higher α-olefines have a stereoregular structure with a high degree of crystallinity which is manifested in an increased melting point of the resulting polymer.

2 Claims, No Drawings

METHOD FOR PREPARING POLYMERS AND COPOLYMERS OF HIGHER α-OLEFINES

The present invention relates to the preparation of polymers and, more particularly, to methods for preparing polymers and copolymers of higher α-olefines with a number of carbon atoms in a molecule of more than 3.

FIELD OF THE INVENTION

Polymers and copolymers of higher α-olefines with a number of carbon atoms in a molecule thereof of more than 3 find an extensive use, due to their thermal- and electro-insulation properties and chemical resistance, in electrical engineering, radioelectronics, manufacture of instruments, medicine, in the production of insulation of cables to be used under the conditions of high temperatures as well as in the manufacture of articles necessitating a high optical transparence of the materials.

BACKGROUND OF THE INVENTION

Known in the art is a method for preparing polymers and copolymers of higher α-olefines comprising polymerization or copolymerization of the starting monomers such as vinylcyclohexane, 4-methylpentene-1, hexene-1, in the presence of a heterogeneous catalyst which is soluble neither in the monomer medium nor in the reaction medium, containing an organoaluminium compound such as triethylaluminium, diethylaluminium chloride and titanium chlorides employed in the ratio of 1:1 and above. The polymerization is conducted in an organic solvent medium such as heptane, hexane, or in the medium of a liquid monomer at a temperature within the range of from 50° to 100° C. under a gauge pressure.

An obligatory condition of the polymerization resides in elimination of the possibility of penetration, into the reactor wherein the process is conducted, of other foreign substances active in respect of organometallic compounds, such as water oxygen, etc. As a result of the polymerization a suspension of the polymer in the solvent is usually formed. In such method the stage of polymerization is followed by the stage of separation and purification of the resulting solid polymer. Separation of the polymer is effected by separation of the solvent (or the monomer in excess) by way of filtration, centrifugation or distillation. Purification of the resulting polymer from the remaining amounts of the catalyst is effected by way of decomposition of the latter at an elevated temperature 100° C. in an alcohol which has been previously added into the suspension of the polymer in a hydrocarbon solvent, whereafter the polymer is washed with the same alcohol (usually twice) and then centrifuged. It is also possible to remove the catalyst by washing with water simultaneously with the treatment of the resulting polymer with a live steam at a temperature of 100° to 105° C. Such removal of the catalyst is generally performed in different apparatus, followed by separation of water by centrifuguation. The thus-produced solid polymer is then dried.

However, the use of alcohol added into the polymer suspension for decomposition of the catalyst complicates the technology of regeneration of the solvent or liquid monomer.

An embodiment of the catalyst removal from the suspension of the resulting polymer by treating said suspension with live steam results in the formation of substantial amounts of waste waters which, owing to the presence of hydrochloric acid, are aggressive, and therefore special measures are required against equipment corrosion.

A principal disadvantage of the prior art method resides in relatively low rates of polymerization and conversion of monomers. Thus, conversion of vinylcyclohexane after 6 hours is usually below 40%, while conversion of 4-methylpentene-1 for the same period is 50-60%. In case of using heterogeneous catalysts based on titanium chlorides, stereoregulation is ensured by the regular crystalline surface of titanium chloride and by the influence of a number of atoms disposed on the crystalline surface, on the process of stereoregular growth of the polymer chain.

Furthermore, as it has been already mentioned hereinabove, the prior art method features a complicated procedure of decomposition of a heterogeneous catalyst and removal of its residues from the reaction mass.

Also known in the art is a method for preparing polyethylene and copolymers of ethylene with another monomer such as propylene by way of contacting said monomers with a homogeneous catalyst (soluble in a carbon medium) based on alkyl aluminium chloride compounds such as a dialkylaluminium chloride and organic derivatives of vanadium such as trialkylvanadate at the ratio between the alkylaluminium chloride compound and vanadium compound of at least 3:1, in a medium of a hydrocarbon solvent. The polymerization is effected at a temperature within the range of from 0° to 70° C. and under an elevated pressure (of up to several dozens of atmospheres).

After the completion of such polymerization process no special treatment of the resulting polymer is required for the decomposition of the catalyst residues.

The production of polyethylene or copolymers of ethylene with the use of homogeneous catalytic systems offers technological advantages of the homogeneous catalysts possessing a high catalytic activity and enabling isolation of the resulting polymers without any troubles inherent in the methods contemplating the use of heterogeneous catalysts.

However, the prior art homogeneous catalysts are suitable only for the production of polyethylene or copolymers of ethylene with another monomer, for example propylene.

It has been thought that a solid crystalline surface of a catalyst is necessary for the formation of stereoregular crystalline higher polyolefines. In some papers it has been pointed out that homogeneous catalyst do not substantially enable polymerization of higher α-olefines and contribute to the formation of low-molecular non-crystalline polymers (cf. W. L. Carreck et al. J. Am. Chem. Soc. 1960, 82, No. 15, pp. 3883-3892; J. Henrici-Olive and S. Olive J. Polymer. Sci. 1970, B, No. 2, p. 205-210).

Known is the process for the preparation, with the use of homogeneous catalysts, of so called syndiotactic polymers such as polypropylene (cf. A. Lambell et al. Macroprol. Chem. 1968, 112, pp. 160-183), but this process is of no practical importance due to an extremely low rate of polymerization and necessity of carrying out the reaction at a low temperature (below −10° C.).

It may be noted that inefficiency of homogeneous catalytic systems such as dialkylaluminium chloridetetraalkoxytitanium or dialkylaluminium chloride-trialkyl vanadate in the production of stereoregular crystalline polymers of higher α-olefines is associated, on the one hand, with chemical instability of the catalytic complexes formed in such systems (the occurence of rapid reversible and irreversible chemical reactions of transformations of the complexes) and, on the other hand, with an insufficient stereoregulating ability of the formed complexes, i.e. their ability to coordinate the propagating end of the polymer chain connecting the monomer in a strictly specific stereo-manner so as to produce a specific stereo configuration of the polymer chain.

In the case of using the known homogeneous catalytic systems, the resulting catalytic complex is substantially a point active center containing no sufficient amount of atoms or ions capable, as it has been mentioned hereinbefore, of ensuring a strict coordination of the growing polymeric chain and the monomer. Therefore, only for the production of polymers and copolymers of ethylene such two-component homogeneous catalytic systems are effective due to the fact that a molecule of ethylene is symmetric, it has no large-size substituents at the double bond, wherefore a high stereoregulating ability of the catalyst is not necessary for polymerization of ethylene with the formation of a regularly arranged polymer chain.

It is an object of the present invention to overcome the above-mentioned disadvantages.

It is an object of the present invention to provide such a simplified method for the production of polymers and copolymers of higher α-olefines, wherein the polymerization would occur at a higher rate of the formation polymers and copolymers and a higher rate of conversion as well.

This object is accomplished by that in the preparation of polymers and copolymers of higher α-olefines polymerization of copolymerization of the starting monomers is effected in the presence of a catalyst containing an alkylaluminium chloride compound and a compound a transition metal belonging to Group IV of the Periodic Table, in a hydrocarbon medium, followed by separation of the solvent and the remaining catalyst from the resulting polymer or copolymer, in accordance with the present invention, said polymerization or copolymerization is effected in the presence of a catalyst additionally containing a trialkylvanadate, while as the compound of a transition metal use is made of an alkoxyderivative of titanium or zirconium, or hafnium.

Owing to the method according to the present invention it is now possible to substantially increase the rate of polymerization and conversion in the preparation of polymers and copolymers of higher α-olefines. Thus, in the preparation, by the prior art method, of a polymer from 3-methylpentene-1 only 60% of the monomer are converted to the polymer for 20 hours, whereas the method according to the present invention makes it possible to reach a conversion rate as high as 70% even after 4 hours of polymerization. In the production of a polymer from vinylcyclohexane by the prior art method less than 30% of the monomer are converted to polymer over 4 hours, whereas the method according to the present invention makes it possible to convert, within the same time period, already 90% of the starting monomer. Polymers of higher α-olefines produced by the method according to the present invention have a stereoregular structure with a high degree of crystallinity, which is manifested in an increased melting point of the resulting polymers; thus the resulting polyvinylcyclohexane has its melting point above 350° C., poly-3-methylpentene-1 has its melting point above 320° C., poly-4-methylpentene-1 has its melting point above 230° C.

To maximally increase the rate of polymerization and the rate of conversion, in accordance with the present invention it is advisable that the catalyst would contain an alkylaluminium chloride compound, chloride compound, an alkoxy derivative of titanium or zirconium or hafnium, and a trialkylvanadate at the following molar ratios between said components: 5.0–100:0.2–5:1 respectively.

Other objects and advantages of the present invention will now be more fully apparent from the following detailed description of the method for preparing polymers and copolymers of higher α-olefines and examples illustrating the same.

The method according to the present invention is intended for the preparation of polymers or copolymers of higher α-olefines such as vinylcyclohexane, 3-methylpentene-1, 3-methylbutene-1, 4-methylpentene, 4,4-dimethylpentene-1, 4,4-dimethylhexene-1. The first and main stage of the method according to the present invention is polymerization or copolymerization of the starting monomers in a hydrocarbon medium such as hexane, heptane, octane, pentane, butane, cyclohexane, toluene. Said polymerization or copolymerization of the starting monomers is performed in the presence of a catalyst containing, in accordance with the present invention, an alkylaluminium chloride compound, an alkoxy derivative of titanium, or zirconium or hafnium, and a trialkylvanadate. As the components of the catalytic system use may be also made of such alkylaluminium chloride compounds as diethylaluminium chloride, diisobutylaluminium chloride, dimethylaluminium chloride, sesquiethylaluminium chloride; such organic derivatives of vanadium as triethylvanadate, triisopropylvanadate, tributylvanadate tri-tert.butylvanadate, triisobutylvanadate; such alkoxy-derivatives of titanium, zirconium or hafnium as tetraethoxy titanium, tetraisopropoxy titanium, tetraisobutoxy titanium, tetraisopropoxy zirconium, tetraisobutoxy hafnium.

We propose a method for preparing polymers or copolymers of higher α-olefines with the use of a catalyst which is a homogeneous stable system. It has been found that for a successful polymerization or copolymerization of higher α-olefines, the catalytic complex should incorporate no one atom of a transition metal (titanium or vanadium), but simultaneously two or more atoms of various transition metals (such as both titanium and vanadium), i.e. catalytic complexes should contain a sufficient number of coordinating centers arranged into a stable structure (i.e. atoms of transition metals) so as to ensure a strict coordination of the propagating and of the polymeric chain and the monomer being attached thereto. The investigations carried out by us in the structure of the catalytic systems employed in the present method with the aid of EPR-spectroscopy and IR-spectroscopy have confirmed the formation of stable catalytic complexes. Thus, the interaction of dialkylaluminium chloride, tetraalkoxy titanium and triethylvanadate gives a complex which is characterized by a PMR spectrum which proves the presence in the complex of trivalent titanium with the spectral line having a "g"-factor of 1.975. and of trivalent vanadium which gives no line in the spectrum, in contradistinction to tri- and tetravalent vanadium. This spectrum practically does not change during 24 hours, this being a confirmation of the catalytic system stability as a whole and of the valence state of titanium and vanadium. In the case of formation of a complex of diethylaluminium chloride and triethyl vanadate, there takes place a rapid change of the spectrum, there appearing spectral lines characteristic of bivalent vanadium which forms as a result of decomposition of the catalytic complex containing trivalent vanadium [Journal, "Plasticheskiye Massy", 1970, No. 5, pp. 23–26; 1976, No. 12, pp. 18–20]. Analysis of the catalytic complex according to the present invention has shown that during polymerization of higher α-olefines the catalyst has a high catalytic activity and a high stereoregulating ability.

It has been experimentally found that the highest effect is observed in the case where polymerization or copolymerization is effected in the presence of a catalyst including an alkylaluminium chloride compound, an alkoxy derivative of titanium or zirconium, or hafnium, and a trialkylvanadate at the following molar ratios of said catalytic components, namely: 5.0–100:0-.2–5:1 respectively.

Polymerization of copolymerization of higher α-olefines occurs as a result of contact between the monomer or a mixture of monomers with the catalyst prepared by interacting an alkylaluminium chloride compound, an alkoxy derivative of titanium of zirconium or hafnium and a trialkylvanadate in said hydrocarbon medium. To ensure a high rate of conversion (up to 70% and more), the contact between said compounds usually does not exceed 4 hours. The polymerization process may be effected both under batch-wise conditions of the supply of the reagents and hydrocarbon medium into the reactor and discharge of the resulting reaction mass, and under continuous conditions of charging and discharging. It is advisable to effect intermixing of the reagents during the polymerization, since this ensures a uniform distribution of said reagents within the reaction volume and heat removal from the reaction zone is facilitated. The catalyst components may be suitably fed into the reactor in the form of solutions in a hydrocarbon solvent (e.g. in the solvent which is used as the reaction medium), the components may be added either separately or in a mixture with each other.

During charging the reagents into the reactor, it is advisable to exclude penetration, into the reaction space, of oxygen, water and other foreign compounds reactive in respect of said components of the catalytic system. Polymerization should be preferably performed at a temperature within the range of from 50° to 120° C. under atmospheric pressure or under a slight overatmospheric pressure generally not exceeding 5 atm and consisting of partial pressures of the solvent vapours, those of the monomers, hydrogen added, when required, to lower the molecular weight of the polymer, and an inert gas which may be admitted into the reactor, e.g. to facilitate discharging of the reaction mass.

The polymerization (or copolymerization) results in the formation of a polymer (copolymer) generally as a suspension in a hydrocarbon medium. Separation of the product from the solvent, residual amounts of the monomers and the catalyst is effected by means of such operations as precipitation of the polymer (copolymer) or settling or filtrating centrifugation respectively.

The final operation of the method according to the present invention is washing of the resulting separated polymer (or copolymer) by means of an organic solvent (use may also be made of the same solvent which is used as the reaction medium in polymerization) or another solvent, followed by separation of the solvent and drying of the resulting polymer (or copolymer).

Polymers (or copolymers) prepared by the method according to the present invention have a high heat-resistance (above 200° C.), high electroinsulating properties (their dielectric loss angle within the range of temperatures of from $-180°$ C. to $+150°$ C. is $2-4\times10^{-4}$), physiological harmlessness, chemical stability. The method according to the present invention makes it possible to achieve conversion rates of as high as 70% already within 4 hours after polymerization of, for example 3-methylpentene-1; vinylcyclohexane is converted to 90% into polymer over 4 hours. Polymers of higher α-olefines prepared by the method according to the present invention have a stereoregular structure and a high degree of crystallinity, which is manifested in a high melting temperature of polymers; thus, the resulting polyvinylcyclohexane has a melting point above 350° C.; poly-3-methylpentene-1 has a melting point above 320° C.

EXAMPLE 1

Polyvinylcyclohexane is prepared in the following manner.

Into a glass reactor provided with a stirrer and exempted, by setting under vacuum, from admixtures of oxygen and humidity, 50 ml of n-heptane are charged. Then, under stirring, there are successively added the following components of the catalyst: 2.4 g of diethylaluminium chloride, 0.3 g of tetraisopropoxytitanium, 0.2 g of triethylvanadate taken in the molar ratio of 20:1:1 respectively. After charging of the catalyst components, the reactor contents is stirred for 2 minutes and then 50 ml (40.5 g) of vinylcyclohexane are added thereto. The reactor temperature is increased to 70° C. and at this temperature polymerization is conducted for 4 hours. The resulting polymeric mass is twice washed with ethanol, while filtering-off the polymer after each washing, whereafter the washed polymer is dried at a temperature of from 70° to 80° C. in a vacuum-drying cabinet to a constant weight.

The resulting polymer has the melting point of 356° C. and intrinsic viscosity (determined in carbon tetrachloride solution at the temperature of 30° C.) equal to 2.4 dl/g. The polymer yield is 37.1 g, i.e. its conversion degree is 91.5%.

EXAMPLE 2

Preparation of polyvinylcyclohexane is effected under the conditions similar to those described in the foregoing Example 1, except that as the catalyst use is made of 6.0 g of diethylaluminium chloride, 0.15 g of tetraisopropoxytitanium and 0.1 of triethylvanadate, the molar ratio between said components being equal to 100:1:1 respectively.

There are prepared 32.4 g of polyvinylcyclohexane (the degree of conversion is 80.0%). The polymer has its melting point of 361° C. and a very high molecular weight, i.e. it is insoluble in carbon tetrachloride at the temperature of 30° C.

EXAMPLE 3 (COMPARATIVE)

The preparing of vinylcyclohexane is conducted under the conditions similar to those described in example 1 hereinbefore, except that as the catalyst use is made of a bicomponent system containing diethylaluminium chloride and tetraisopropoxytitanium in the molar ratio of 20:1 respectively. After 4 hours only traces of the polymer are obtained and properties of the product are impossible to determine.

EXAMPLE 4 (COMPARATIVE)

The preparing of vinylcyclohexane is conducted under the conditions similar to those described in Example 1 hereinbefore, except that as the catalyst use is made of a bicomponent system including diethylaluminium chloride and triethylvanadate in the molar ratio of 20:1.

As a result, 2.6 g of a polymer with the melting point of 314° C. and intrinsic viscosity of 1.5 dl/g are obtained. The degree of conversion is 6.4%.

EXAMPLE 5 (COMPARATIVE)

Preparation of polyvinylcyclohexane is effected under conditions similar to those of example 1, except that as the catalyst use is made of a bicomponent system consisting of triisobutylaluminium and titanium trichloride in the molar ratio of 2.5:1 respectively.

There are produced 11.5 g of polyvinylcyclohexane with the melting point of 340° C. and intrinsic viscosity of 3.1 dl/g; the degree of conversion is equal to 28.5%.

EXAMPLE 6

Preparation of a copolymer of vinylcyclohexane and hexene-1 is performed in the following manner.

Into a reactor prepared as in Example 1 there are charged 45 ml of n-hexane, 1.5 g of diethylaluminium chloride and then a solution of 0.6 g of tetraethoxytitanium and 0.1 g of triethylvanadate in 5 ml of n-hexane; the molar ratio between diethylaluminium chloride, tetraethoxytitanium and triathylvanadate is equal to 25:5:1 respectively.

Then into the reactor there are charged 45 ml (36.5 g) of vinylcyclohexane and 5 ml (3.4 g) of hexene-1.

As a result of the copolymerization conducted at the temperature of 70° C. for 4 hours there are obtained 32.7 g of a copolymer of vinylcyclohexane with hexane-1; the degree of conversion of the monomers is equal to 82.2%. The washing solution of the product and drying are conducted as in Example 1. The copolymer has its melting point of 304° C. and intrinsic viscosity (carbon tetrachloride, 30° C.) equal to 2.88 dl/g.

EXAMPLE 7

Preparation of a copolymer of vinylcyclohexane and butene-1 is effected in the following manner.

Into a reactor prepared as described in example 1 hereinbefore, there are charged 50 ml (40.3 g) of a mixture of vinylcyclohexane and butene-1 (weight content of butene in this mixture is 2%). As the catalyst components charged into the reactor are 2.4 g of diethylaluminium chloride, 0.4 g of tetraisobutoxytitanium and 0.2 g of triethylvanadate (molar ratio between said components is 20:1:1 respectively).

Copolymerization conducted at the temperature of 70° C. for 4 hours gives 33.2 g of a copolymer of vinylcyclohexane with butene-1; conversion degree is 82.5%. The washing isolation and drying are conducted as described in example 1. The copolymer has its melting point of 327° C. and intrinsic viscosity of 1.95 dl/g.

EXAMPLE 8

Preparation of a polymer of 4-methylpentene-1 is conducted in the following manner:

Into a reactor prepared as in Example 1 hereinbefore, there are charged 2.4 g of diethylaluminium chloride, 0.3 g tetraisopropoxytitanium and 0.2 g of triethylvanadate (molar ratio between said components is 20:1:1 respectively). Thereafter, charged into the reactor are 50 ml (33.3 g) of 4-methylpentene-1.

Polymerization conducted at the temperature of 70° C. for 4 hours gives 30.5 g of the polymer; the degree of conversion is 91.5%.

The resulting polymer after the initial filtration is washed not with an alcohol, but with n-heptane; said filtration and washing are conducted in the atmosphere of pure nitrogen.

The thus-prepared polymer has its melting point of 232° C. and intrinsic viscosity (decaline, 135° C.) of 3.35 dl/g. By the method of combustion the content of mineral residues of the catalyst in the polymer is determined to be equal to 0.04% by weight, i.e. a sufficient degree of washing of the polymer from the catalyst is attained without the use of any additional washing agents.

EXAMPLE 9

Under the conditions similar to those described in example 8 there is performed copolymerization of 4-methylpentene-1 with hexene-1, wherefor into the reactor there is charged a mixture of said monomers containing 10% by weight of hexene-1. As the catalyst components use is made of 3 g of diethylaluminium chloride, 0.10 g of tetraethoxytitanium and 0.5 g of triethylvanadate (molar ratio between the catalyst components is 10:0.2:1 respectively).

As a result, there are obtained 28.5 g of a copolymer of 4-methylpentene-1 and hexene-1; the degree of conversion is 84.5%. The copolymer has its melting point of 192° C. and intrinsic viscosity of 3.7 dl/g.

EXAMPLE 10

Preparation of a polymer of 3-methylpentene-1 is effected under the conditions similar to those described in example 1 hereinbefore.

As the catalyst components charged into the reactor use is made of 2.8 g of diisobutylaluminium chloride, 0.20 g of tetraethoxytitanium and 0.2 g of triethylvanadate (the molar ratio therebetween is equal to 20:1:1 respectively). Then 50 ml (33.5 g) of 3-methylpentene-1 are charged into the reactor.

Over the period of four hours there are obtained 23.5 g of the polymer (the degree of conversion is equal to 70.1%) having its melting point of 324° C. and intrinsic viscosity (decaline, 135° C.) equal to 3.7 dl/g.

EXAMPLE 11 (COMPARATIVE)

For the purpose of comparison with the process described in the foregoing example 10, polymerization of 3-methylpentene-1 is conducted with the use of a catalytic system based on titanium trichloride. As the catalyst components 0.5 g of diethylaluminium chloride and 0.2 g of titanium trichloride are charged into the reactor.

Polymerization is conducted at the temperature of 80° C. for 20 hours to give 20.4 g of the polymer; the degree of conversion is equal to 61%.

EXAMPLE 12

Preparation of polyvinylcyclohexane is effected under the conditions similar to those described in example 1.

Polymerization of the starting monomers is effected at the temperature of 120° C.; as the polymerization medium use is made of n-octane.

There are obtained 32 g of polyvinylcyclohexane with the melting point of 337° C. and intrinsic viscosity of 1.1 dl/g.

EXAMPLE 13

Preparation of polyvinylcyclohexane is effected under the conditions similar to those described in example 1.

As the catalytic system use is made of 2.4 g of diethylaluminium chloride, 0.5 g of tetraisobutoxyhafnium, 0.2 g of triethylvanadate.

There are obtained 36.5 g of polyvinylcyclohexane (the degree of conversion is equal to 90%), melting point of the resulting polymer is 335° C., intrinsic viscosity is equal to 1.8 dl/g.

EXAMPLE 14

Preparation of polyvinylcyclohexane is effected under the conditions similar to those of example 1 hereinbefore, only as the catalytic system use is made of diethylaluminium chloride, 0.3 g of tetraisopropoxyzirconium and 0.2 g of triethylvanadate.

There are obtained 34.3 g of polyvinylcyclohexane; the degree of conversion is equal to 84.7%. The resulting polymer has the melting point of 340° C. and intrinsic viscosity of 2.1 dl/g.

What is claimed is:

1. A method for preparing crystalline polymers and copolymers of higher α-olefins having from 4 to 8 carbon atoms which comprises polymerizing or copolymerizing in a hydrocarbon medium said α-olefins in a reactor in the presence of a homogeneous catalyst soluble in the hydrocarbon medium containing an alkylaluminum chloride, trialkyl vanadate and an alkoxy derivative of a metal selected from the group comprising titanium, zirconium, hafnium, and then separating the hydrocarbon medium and remaining catalyst from the resultant polymer or copolymer.

2. A method for preparing polymers and copolymers of higher α-olefines as claimed in claim 1, wherein the catalyst contains an alkylaluminium chloride compound and an alkoxyderivative of a metal selected from the group consisting of titanium, zirconium, hafnium and a trialkylvanadate at the following molar ratios between said components of the catalyst: 5.0–100:0.2–5:1 respectively.

* * * * *